United States Patent
Dhanadevan et al.

(10) Patent No.: US 10,348,519 B2
(45) Date of Patent: Jul. 9, 2019

(54) VIRTUAL TARGET PORT AGGREGATION

(71) Applicant: HEWLETT PACKARD ENTERPRISE DEVELOPMENT LP, Houston, TX (US)

(72) Inventors: Komateswar Dhanadevan, Bangalore (IN); Navaruparajah Nadarajah, Roseville, CA (US); Rajesh Nadubail, Bangalore (IN); Harsha Basavarajappa, Bangalore (IN); Renjith P George, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 89 days.

(21) Appl. No.: 15/523,102

(22) PCT Filed: Nov. 20, 2014

(86) PCT No.: PCT/US2014/066728
§ 371 (c)(1),
(2) Date: Apr. 28, 2017

(87) PCT Pub. No.: WO2016/081005
PCT Pub. Date: May 26, 2016

(65) Prior Publication Data
US 2017/0338977 A1    Nov. 23, 2017

(51) Int. Cl.
*H04L 12/64* (2006.01)
*G06F 13/40* (2006.01)
*G06F 3/06* (2006.01)

(52) U.S. Cl.
CPC ...... *H04L 12/6418* (2013.01); *G06F 13/4022* (2013.01); *G06F 3/067* (2013.01);
(Continued)

(58) Field of Classification Search
CPC combination set(s) only.
See application file for complete search history.

(56) References Cited

U.S. PATENT DOCUMENTS

| 7,145,877 B2 | 12/2006 | Natarajan et al. |
| 7,391,728 B2 | 6/2008 | Natarajan et al. |
| (Continued) | | |

FOREIGN PATENT DOCUMENTS

CN    102624613 A    8/2012

OTHER PUBLICATIONS

Brocade Communications Systems, Inc., "ISL Trunking for Brocade VCS Fabrics," 2013, <https://community.brocade.com/dtscp75322/attachments/dtscp75322/EthernetFabric/25/1/ISL%20Trunking%20for%20Brocade%20VCS%20Fabrics%20At-a-Glance.pdf>.

(Continued)

*Primary Examiner* — Ronald B Abelson

(57) ABSTRACT

Approaches for aggregating ports of switch connected to ports of a target node, are described. In one example, for a fiber channel exchange received from a host node, for a target node a plurality of target node ports of the target node associated with the virtual port are determined. The fiber channel exchange comprises a sequence of frame. Once the plurality of target node ports are determined, a first frame is directed to one target node port selected from the plurality of the target node ports, where the one target node port is selected based port selection criteria. Based on the directing of the first frame, subsequent frames of the fiber channel exchange to the selected one target node port are also directed.

20 Claims, 9 Drawing Sheets

(52) U.S. Cl.
CPC .............. *H04L 2012/6421* (2013.01); *H04L 2012/6443* (2013.01); *H04L 2012/6467* (2013.01)

(56) References Cited

U.S. PATENT DOCUMENTS

| | | | |
|---|---|---|---|
| 7,460,527 | B2 | 12/2008 | Ghosh et al. |
| 7,817,656 | B1 | 10/2010 | Deng et al. |
| 8,223,633 | B2 | 7/2012 | Gupta et al. |
| 8,798,091 | B2 * | 8/2014 | Black .................. H04J 3/245 370/461 |
| 2004/0024911 | A1 | 2/2004 | Chung et al. |
| 2008/0219249 | A1 | 9/2008 | McGlaughlin |
| 2010/0226281 | A1 | 9/2010 | Ghosh et al. |
| 2012/0011240 | A1 | 1/2012 | Hara et al. |
| 2013/0117481 | A1 | 5/2013 | Allen et al. |
| 2013/0322457 | A1 * | 12/2013 | Budhia ................ H04L 49/253 370/401 |
| 2014/0029608 | A1 | 1/2014 | Ayandeh |

OTHER PUBLICATIONS

Brocade; "Brocade ISL Trunking," 2011, <https://www.brocade.com/content/dam/common/documents/content-types/datasheet/isl-trunking-ds.pdf>.

International Search Report & Written Opinion received in PCT Application No. PCT/US2014/066728, dated Aug. 18, 2015, 13 pages.

LordAuch et al., "Ganging two ethernet conections togeather?," 2010, (web page), <http://forums.fedoraforum.org/archive/index.php/t-242118.html>.

Nix Craft, "RHEL: Linux Bond / Team Multiple Network interfaces (NIC) Into a Single Interface," Sep. 4, 2011; <http://web.archive.org/web/20140722193126/http://www.cybercit.

Oracle, "Overview of IP Network Multipathing," IP Network Multipathing Administration Guide, Chapter 1, Mar. 6, 2014, <http://web.archive.org/web/20140306192352/http://docs.oracle.com/cd/E19455-01/806-6547/6jffv7oma/index.html>.

Technical Committee T11, "T11 Home Page," (Web Page), Fiber Channel—FC2 layer protocol specification, Aug. 4, 2015, 2 pages, available at http://www.t11.org.

Webopedia, "Network Multipathing," Oct. 18, 2014, <http://web.archive.org/web/20141018170845/http://www.webopedia.com/TERM/N/network_multipathing.html>.

Wikipedia, "Link Aggregation," (Web Page), Dec. 8, 2015, 10 pages, available at http://en.wikipedia.org/wiki/Link_aggregation.

Zordo, "Network Card Bonding on CentOS," Jul. 4, 2007, <http://web.archive.org/web/20140804201634/http://www.howtoforge.com/network_card_bonding_centos>.

American National Standards Institute, Inc., "Fibre Channel—Link Services (FC-LS-2)," Aug. 2, 2010, INCITS xxx-200x Link Services Rev 2.21.

Zoltán Meggyesi, "Fibre Channel Overview," Oct. 31, 2014, (web page), <https://web.archive.org/web/20141031001020/http://hsi.web.cern.ch/HSI/fcs/spec/overview.htm>.

Nix Craft, "RHEL: Linux Bond / Team Multiple Network Interfaces (NIC) Into a Single Interface," Jul. 22, 2014 <https://web.archive.org/web/20140722193126/http://www.cyberciti.biz/tips/linux-bond-or-team-multiple-network-interfaces-nic-into-single-interface.html>.

Technical Committee T11, "T11 Home Page," Nov. 11, 2014, <https://web.archive.org/web/20141104060543/http://www.t11.org/index.html>.

Wikipedia, "Link aggregation," Nov. 10, 2014, <https://en.wikipedia.org/w/index.php?title=Link_aggregation&oldid=633273005>.

* cited by examiner

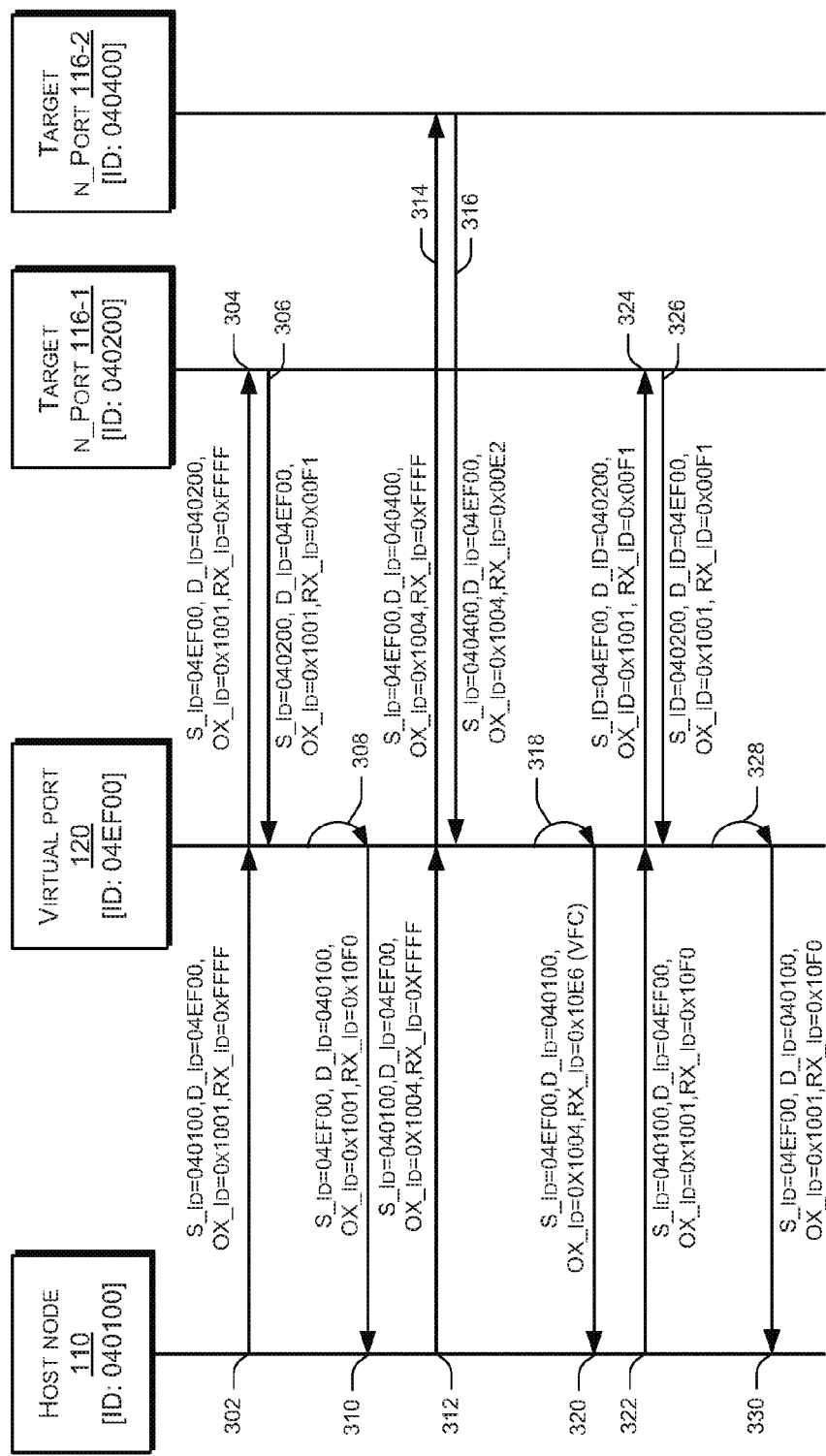

VIRTUAL TARGET PORT AGGREGATION

BACKGROUND

Increasing storage requirements have led to the development of storage area networks (SAN). SANs may provide access to data storage besides the local storage capabilities that may be available for computing devices, such as servers. Generally, SAN may be implemented using Fibre Channel based networking architecture. An example of such an architecture includes, Fibre Channel over Ethernet (FCoE). As would be understood, Fibre Channel (FC) provides a collection of protocols for managing functionalities of such a communication network.

BRIEF DESCRIPTION OF THE DRAWINGS

The following detailed description references the drawings, wherein:

FIG. 3A is example call-flow diagram for affecting FC exchange by virtual port aggregation of target nodes;

DETAILED DESCRIPTION

Figure 1A:
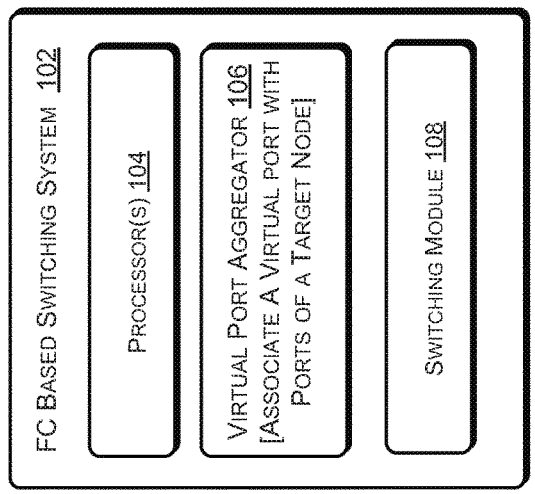
FIG. 1A is a block diagram of an example system for virtual port aggregation of target nodes.

Storage area networks (SANs) being implemented using Fibre Channel (FC) based switching mechanisms have evolved at a rapid rate. Generally, a SAN may include a plurality of Fibre Channel (FC) based switches which are operatively connected to each other to form a switching fabric. As would be understood, each of the switches may include a plurality of ports. To form a switching fabric, each of the switches within the fabric is connected through the ports.

Besides the switches, the SAN may further include a plurality of devices (also referred to as nodes). Similar to the switches, the nodes also include a plurality of ports. The ports of the nodes may be connected to the ports of one or more switches to affect a connection between the nodes and the switching fabric. Within the SAN, the switching fabric may be further communicatively coupled to a plurality of storage arrays.

Generally, input-output communication between the nodes in an FC based network is carried out in the form of exchanges. An exchange may further include a series of frames. The exchange may be initiated by a node (referred to as the host node), through its host port and may be directed to a target port associated with one or more of the storage arrays (referred to as the target node). When a sequence of frames for a given exchange is received by a switch within the switching fabric, a destination identifier may be determined based on the received frame. Accordingly, the switch may direct the exchange to another port which may in turn be associated with a port of the target node. The process may be repeated for subsequent exchanges as well. Within the SAN, it may be the case that the data processing capabilities of the FC based switches and the target nodes may differ, i.e., the target nodes may not be capable of handling data transfer due to limitations such as speed or more number of initiators sending input-output (I/O) command to the same target port. In certain cases, this may result in a bottleneck. As a result, the efficiency of the SAN may decrease.

Approaches for aggregating the ports of the target node, are described. As per an example of the present subject matter, a FC based network may include one or more host nodes communicatively connected to target nodes through a FC based switching system. The FC based switching system may include a plurality of switch ports, with the target nodes including a plurality of target node ports. Initially, ports of the target nodes which are connected to the FC based switching system, may be determined. In one example, each of the ports of the target node may be identifiable by a port identifier. The switch ports may be further connected to the target node ports for affecting the connection between the FC based switching system and the target node.

Returning to the present subject matter, once each of the port identifiers of the respective target ports is determined, a virtual port may be further created with the virtual port being identifiable by a virtual port identifier or virtual port ID. On creating the virtual port and on obtaining the virtual port identifier, the target node ports may be further aggregated by associating the virtual port with the plurality of target node ports. In one example, the virtual port may be logically associated with the switch ports with which the target node ports are connected. In such a case, virtual ports may be implemented in different switches each of which may be connected to a plurality of target node ports.

The virtual port may subsequently be used for affecting FC exchange between one or more host nodes and the target nodes. While implementing FC exchange, instead of the physical ports of the target node, the virtual port would be made available for the incoming exchange from different ports of one or more host nodes. For example, for a host node intending to write data onto a storage target node, only the virtual node may be visible, instead of the physical ports of the target node.

On receiving the exchange from the port of the host node by the virtual port, target ports which have been associated with the virtual port are determined. Once all ports of the target node associated with the virtual port are determined, one target node port may be identified, and frames corresponding to the exchange may be provided to the identified target port. Subsequently, for another exchange, another target node port may be identified, and the frames of another exchange may be routed to such another identified target node port. In the present example, the target node port may be identified based on a load balancing mechanism. In one example, load balancing may be implemented using predefined rules or policies.

The above approaches may be implemented in one or more FC based switching devices for aggregating ports of a switching system and a target node. For example, the above mentioned approaches may be implemented by FC based switching system within a SAN. While implementing the above mentioned approaches, the switching system may be in communication with one or more other computing devices (i.e., host nodes) and data storage over a Fibre Channel (FC) based communication network, through their respective ports. For example, the switching system may be connected to the ports of the data storage (i.e., the target node). As would be understood, the FC based communication network may be implemented using different types of FC based infrastructure. An example of a FC based communication network may be based on, but not limited to, a Fibre Channel over Ethernet (FCoE). The switching system may determine the ports of the target node with which it is communicatively connected, and aggregate the ports through a virtual port. For example, for aggregating the ports of the target node, the switching system may associate a plurality of target node ports to the virtual port. Subsequently for affecting FC based exchange, only the virtual port is made visible.

These and other examples are further described herein with reference to FIGS. 1-7. It is to be noted that the description and figures relate to example implementations, and is not to be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples, are intended to encompass equivalents thereof.

FIG. 1A provides a block diagram of an example Fibre Channel (FC) based switching system 102 for virtual port aggregation of target nodes. The FC based switching system 102 may be implemented, for example, within a FCoE based network. Furthermore, the FC based switching system 102 may be implemented using one or more computing based network devices, for example switches. The switching system 102 may further act as an interface between host and target, and with other networking devices, such as routers, and HBAs (not shown) within a networking environment. The FC based switching system 102 may be deployed within a storage area network for providing data storage. In the present example as illustrated in FIG. 1A, the FC based switching system 102 may further include processor(s) 104, virtual port aggregator 106 and a switching module 108.

The processor(s) 104 may be implemented as microprocessors, microcomputers, microcontrollers, digital signal processors, central processing units, state machines, logic circuitries, and/or any devices that manipulate signals based on operational instructions. The functions of various elements shown in figures, including a functional block labelled as "processor(s)", may be provided through the use of dedicated hardware as well as hardware capable of executing machine readable instructions. The FC based switching system 102 through the virtual port aggregator 106 and the switching module 108 implements virtual port aggregation of target nodes. In one example, the virtual port aggregator 106 may aggregate a plurality of ports of a target node, and associate the aggregated nodes with a virtual port implemented within the FC based switching system 102. Any FC exchange is subsequently directed to the virtual port, rather than any of the specific ports of the target node. The switching module 108 may subsequently route frame of the FC exchange to a selected port of the target node. These, and other aspects are described in detail in conjunction with the remaining figures.

Figure 1B:
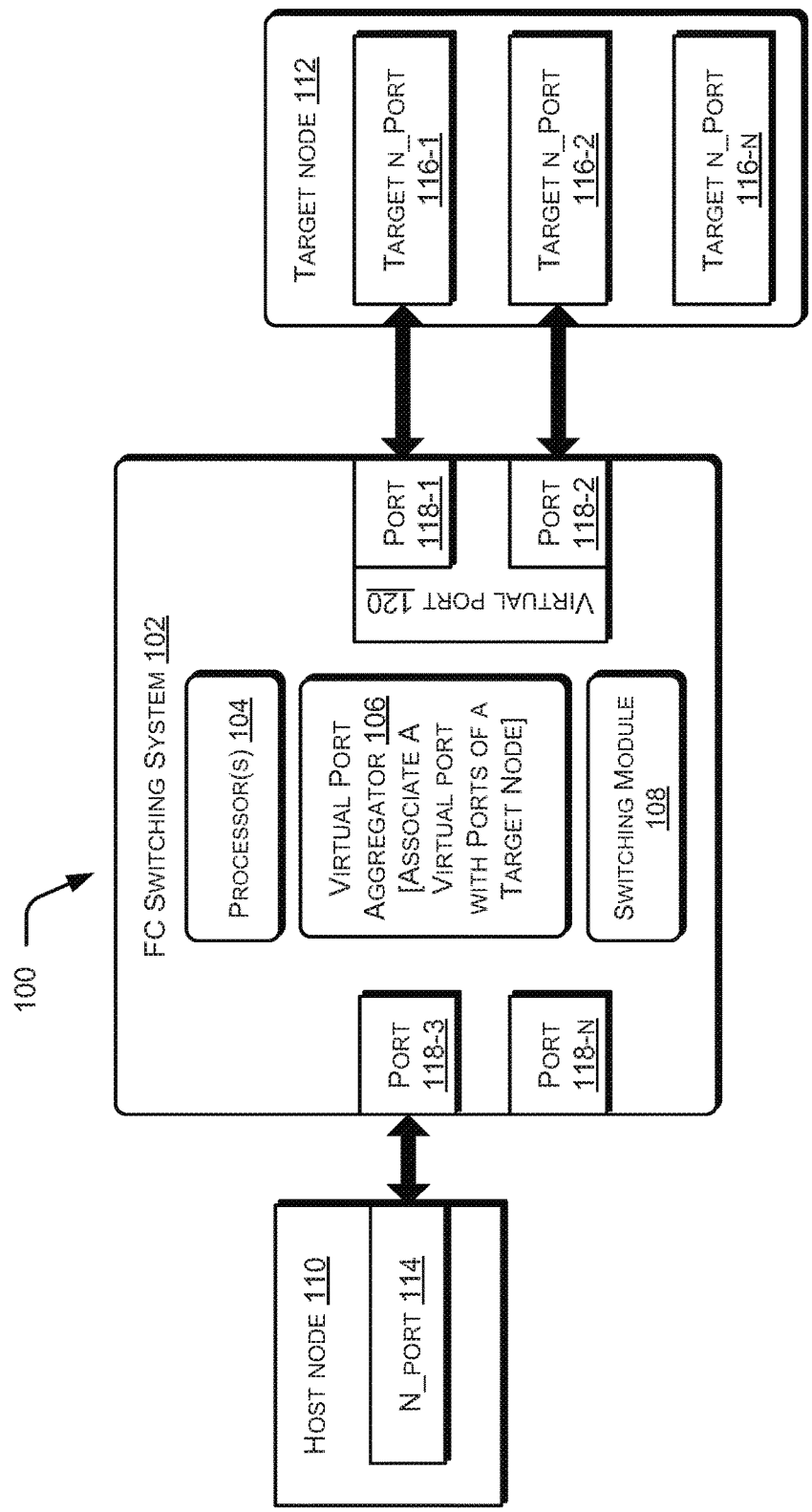
FIG. 1B is a communication network environment implementing an example system for virtual port aggregation of target nodes.

FIG. 1B further illustrates a network environment 100 for virtual port aggregation of target nodes. For example, within the network environment 100 the FC based switching system 102 may be communicative connected to a host devices (also referred to as a host node 110), and a storage devices (also referred to as a) target node 112. The host node 110, through its operation, may seek to read or write data on the target node 112. In the example as illustrated, the FC based switching system 102 includes a processor(s) 104, the virtual port aggregator 106 and the switching module 108.

Continuing further, each of the FC based switching system 102, host node 110 and the target node 112 may each include a plurality of physical ports. For example, the host node 110 may include a host port 114 (referred to also as an n_port 114). Similarly, the target node 112 may also include a plurality of target node ports 116-1, 116-2, . . . , 116-n (collectively referred to as target n_ports 116). Each of the target n_ports 116 may be further communicatively coupled to physical ports of the FC based switching system 102, i.e., the ports 118-1, 2, . . . , n (collectively referred to as the switch ports 118).

As described, while implementing a connection the switch ports 118 of the FC based switching system 102 may be connected to respective target n_ports 116 of the target node 112. In operation, the virtual port aggregator 106 may determine which of the physical ports of the target node 112, i.e., target n_ports 116, are available and connected to the switch ports 118. Accordingly, respective device identifiers of each of the target n_ports 116 of the target node 112 may be further determined. In one example, the target node 112 may correspond to one or more logical units or LUNs, each associated with a corresponding LUN ID.

Once the device identifiers associated with each of the target n_ports 116 is determined, the virtual port aggregator 106 may implement a virtual port 120 identifiable through a virtual port identifier or virtual port ID. In one example, the virtual port 120 may be logically implemented over the switch ports 118 of the FC based switching system 102. In another example, the virtual port aggregator 106 may determine the virtual port ID based on at least the device identifiers of the target n_ports 116. The virtual port 120 may subsequently be mapped with each of the target n_ports 116.

Once the virtual port 120 and the target n_ports 116 have been mapped, the virtual port aggregator 106 may further make available only the virtual port 120 to the host nodes, such as the host node 110. In such a case, the virtual port 120 would be visible and available to other host devices for fibre channel communication. None of the target n_ports 116 would be accessible or visible to any of the other host devices, such as host node 110. As a result, all communication would be directed towards the virtual port 120. Once the target n_ports 116 have been mapped to the virtual port 120, the target n_ports 116 may be considered as aggregated.

As would also be understood, input or output (I/O) based FC communication is carried out through a fibre channel exchange. Each exchange is further composed of a sequence of frames that occurs between the ports of the host node 110 and the target node 112. In other cases, like for example in FC-4 protocols, an information unit may be carried in multiple fibre channel frames. For affecting the I/O communication, a host device, such as the host node 110, may determine the virtual port 120 to be visible. As explained in the preceding paragraphs, each virtual port 120 aggregates, i.e., is associated with a plurality of target n_ports 116. On receiving the sequence of frames from the host node 110, the virtual port aggregator 106 may determine all the ports of the target node 112 which are associated with the virtual port 120. Once determined, the virtual port aggregator 106 may further select one target node port, such as target n_port 116-1 from amongst the target n_ports 116. For selecting, in an example, the virtual port aggregator 106 may utilize a load balancing mechanism. In other example, the virtual port aggregator 106 may also utilize one or predefined policies for identifying one target port node.

On identifying the target n_port 116-1, the switching module 108 redirects the frame sequence corresponding to an exchange to the target n_port 116-1. Similarly, for subsequent exchanges other target port nodes, such as target n_port 116-2 may be identified. In such a case, the switching module 108 may subsequently direct all frame sequences corresponding to the second exchange to the target n_port 116-2. In this manner, the virtual port aggregator 106 allows for simultaneously transmitting frame sequences for different corresponding exchanges to the appropriate ports of the target node 112. Since the frames of a specific exchange are being communicated to one port of the target node, no other mechanisms, such as a hash table, for reconstructing the frames are needed. This reduces the processing overheads of the FC based switching system 102 imposed due to such hash tables. Although the present explanation has been provided with respect to only one host device, i.e., host node 110, multiple host nodes may further be communicatively connected to the FC based switching system 102, without deviating from the scope of the present subject matter. These and other aspects of the present subject matter are provided with additional details in conjunction with the description for FIGS. 2-3.

Figure 2:
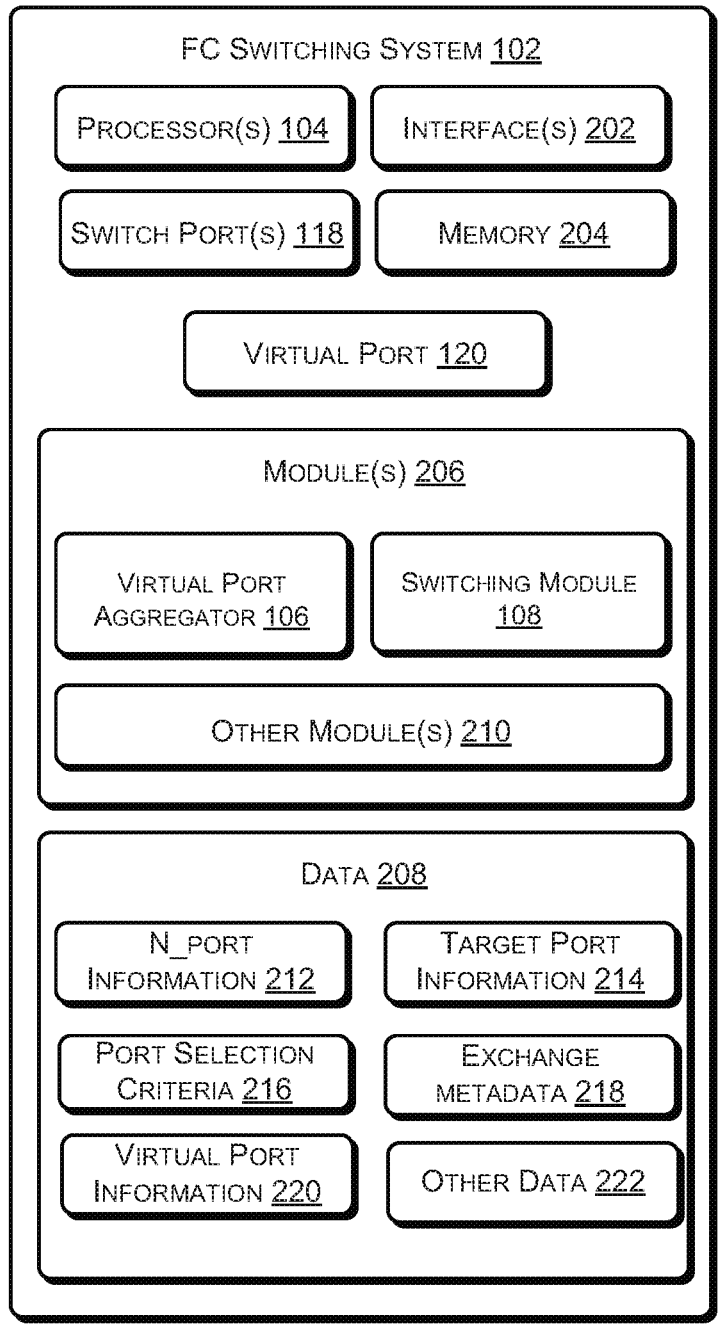
FIG. 2 is a block diagram of another example system for virtual port aggregation of target nodes.

FIG. 2 illustrates an example FC based switching system 102 for aggregating ports of a target node. The FC based switching system 102 may be implemented as network switch or through a combination of network switches. In the present example, the FC based switching system 102 includes processor(s) 104, interface(s) 202, ports 118 and memory 204. The processor(s) 104 may also be implemented as signal processor(s), state machine(s), logic circuitries, and/or any other device or component that manipulate signals based on operational instructions.

The interface(s) 202 may include a variety of interfaces, for example, interfaces for data input and output devices, referred to as I/O devices, storage devices, network devices, and the like, for communicatively associating the FC based switching system 102 either one or more host nodes, such as host node 110, or with one or more storage array devices, such as the target node 112 (not shown in FIG. 2), which in turn form the constituent elements of a storage area network (SAN). The interface(s) 202 may be implemented as either hardware or software. The FC based switching system 102 may further include a plurality of ports 118. The ports 118 allow for interfacing with the one or more host devices, such as the host node 110, and a plurality of storage devices, such as target node 112, within a storage area network (SAN). The FC based switching system 102 may further include virtual port 120 which is associated with a plurality of target n_ports 116, such as target n_port 116-1 and target n_port 116-2 (as was indicated in FIG. 1B).

The memory 204 may store one or more executable instructions, which may be fetched and executed so as to aggregate ports of a target node. An example of such an instruction includes, but is not limited to, firmware for the FC based switching system 102 for implementing multiple functionalities. The memory 204 may be non-transitory computer-readable medium including, for example, volatile memory, such as RAM, or non-volatile memory such as EPROM, flash memory, and the like.

The FC based switching system 102 may further include module(s) 206 and data 208. Amongst other things, the data 208 includes host port information 212, target port information 214, port selection criteria 216, exchange metadata 218, virtual port information 220 and other data 222. The module(s) 206 may be implemented as a combination of hardware and programming (e.g., programmable instructions) to implement one or more functionalities of the module(s) 206. In one example, the module(s) 206 include a virtual port aggregator 106 and switching module 108. The FC based switching system 102 may further include other module(s) 210 for implementing functionalities that supplement applications or functions performed by the FC based switching system 102.

In examples described herein, such combinations of hardware and programming may be implemented in a number of different ways. For example, the programming for the module(s) 206 may be processor executable instructions stored on a non-transitory machine-readable storage medium and the hardware for the module(s) 206 may include a processing resource (e.g., one or more processors), to execute such instructions. In the present examples, the machine-readable storage medium may store instructions that, when executed by the processing resource, implement module(s) 206 or their associated functionalities. In such examples, the FC based switching system 102 may include the machine-readable storage medium storing the instructions and the processing resource to execute the instructions, or the machine-readable storage medium may be separate but accessible to FC based switching system 102 and the processing resource. In other examples, module(s) 206 may be implemented by electronic circuitry.

The operation of the FC based switching system 102 implementing the virtual port 120 is further described in conjunction with a call flow diagram as depicted in FIG. 3A. FIG. 3A depicts interaction of a host node, exemplified as host node 110, with the virtual port 120 of the FC based switching system 102. The host node 110 as depicted in the present example, is interacting with the FC based switching system 102 for writing to one or more storage devices, as depicted by the target node 112.

In the present example, the host node 110 may further include a port, i.e., n_port 114. Furthermore, the target node 112 may include a plurality of target node ports. For the purposes of this explanation, and without any limitation, the present FIG. 3A depicts two ports namely target n_port 116-1 and target n_port 116-2. Each of the ports of the host node 110 and the target node 112 are further identifiable by a port identifier or port ID. For example, the n_port 114 may have the port ID as 040100. In one example, the port ID of the host node 110 may be saved in host port information 212. The virtual port 120 may be associated with a virtual port ID, which in the present example is 04EF00. In one example, the virtual port ID may either be generated each time port aggregation is to be affected. In another example, any one of the port IDs of the ports of the target node 112 (i.e., target n_port 116-1 and target n_port 116-2) may be used as the virtual port ID.

The target port nodes, target n_port 116-1 and target n_port 116-2 are further associated with the identifiers 040200 and 040400, respectively. Each of the target n_ports 116, i.e., target n_port 116-1 and target n_port 116-2 are aggregated based on which the virtual port 120 is created. As explained previously, the virtual port 120 is further associated with the target n_port 116-1 and the target n_port 116-1 as a result of the aggregation. The information related to the target n_ports 116 may be saved in target port information 214.

For affecting the exchange, the host node 110 may initially determine the ports of the FC based switching system 102 which may be available for transmitting the frame of the exchange. The FC based switching system 102 may only publish the virtual port 120 to be available for transmitting the frames corresponding to a first exchange. For example, the FC based switching system 102 may only publish the port ID 04EF00 as being available for the exchange. The port ID of the virtual port 120 may be saved in virtual port information 220. In one example, the virtual port ID, i.e., 04EF00 may be further associated with a virtual node world wide name (WWN). The virtual node WWN may be stored in other data 222.

On determining the port with the identifier 04EF00 to be available, the host node 110 initiates the communication of a first frame of the exchange to the FC based switching system 102. The host node 110 while transmitting the frame, may associate certain metadata associated the frame to be transmitted. In one example, the metadata may include information indicating the source, destination, originator and the receiver of the frame. For example, the host node 110 may include such metadata in the frame header, in the form of a source identifier (S_ID), a destination identifier (D_ID), an originator identifier (OX_ID) and a receiver identifier (RX_ID). Besides the aforementioned information, in an example, the frame header may also provide the various bits to indicate whether the exchange is a new exchange, or to indicate whether the frame is at a first position or a last position within the exchange sequence.

In the present example, the host node 110 may set the metadata based on the originating source of the frame, i.e., the n_port 114, and also based on the destination for the frame under consideration. For example, the host node 110 may provide the S_ID as 040100, the D_ID as 04EF00. The host node 110 may further generate a unique originator identifier, i.e., OX_ID as 0x1001, and a unique receiver identifier, the receiver identifier identifies the target entity receiving the frame under consideration. Since at the time of initiating the exchange, the frame has not yet been received by any target node, the host node 110 may allot the RX_ID to be empty with the value 0xFFFF. With the present metadata set, the host node 110 transits the frame to the only port which is present visible, i.e., the virtual port 120 of the FC based switching system 102. This is represented as step 302 in FIG. 3.

Once the frame is received by the FC based switching system 102, the frame may be redirected to one of the ports of the target node 112. While redirecting, it may be noted that the source for such a frame would now be the virtual port 120. Furthermore, the destination of the frame would also be one of the ports of the target node 112. Accordingly, in the present example, the virtual port aggregator 106 may change the metadata within the frame header to reflect the change in the source and the destination. For example, the virtual port aggregator 106 may modify the S_ID to the 04EF00 (which was initially 040100). Furthermore, the virtual port aggregator 106 may also modify the D_ID to one of the ports of the target node 112. As per the present example, the target node 112 includes two ports, namely, the target n_port 116-1 and the target n_port 116-2. The two ports, target n_port 116-1 and target n_port 116-2, are aggregated and associated with the virtual port 120. Although the present example depicts only two ports, namely target n_port 116-1 and target n_port 116-2, multiple other ports may also be considered for port aggregation without deviating from the scope of the present subject matter.

On receiving a frame from the host node 110, the virtual port aggregator 106 may determine which ports may be associated with the virtual port 120. On determining that target n_port 116-1 and target n_port 116-2 are associated with the virtual port 120, the virtual port aggregator 106 may further identify and select one of the two ports for transmitting the frame. Subsequent frames of the same exchange would also be routed to the selected target port.

In one example, the virtual port aggregator 106 may select target n_port 116-1 as the port for transmitting the frame under consideration. The selection of any of the ports of the target node 112 may be based on one or more port selection criteria 216. The port selection criteria 216 may specify the criteria based on which the virtual port aggregator 106 may select one or more ports of the target node 112. The port selection criteria 216 may specify a load balancing mechanism, or a plurality of rules based on which the virtual port aggregator 106 may select one of the ports of the target node 112. For example, the predefined rules may indicate that any first exchange may be allotted to target n_port 116-1 and the next exchange may be redirected to the target n_port 116-2.

In the present example, the virtual port aggregator 106 may select target n_port 116-1 based on the port selection criteria 216. On selection of the target n_port 116-1, the virtual port aggregator 106 may modify the header information of the frame, such that the S_ID is now 04EF00, and the D_ID is now 040200 (the port ID for target n_port 116-1). It may be noted that since the node from which the frame had originated remains unchanged, the virtual port aggregator 106 does not modify the OX_ID and the RX_ID. With the modified header information, the frame is subsequently transmitted to the target n_port 116-1 of the target node 112 (step 304 of FIG. 3). Once received, the target n_ports 116 may subsequently provide a return message indicating with the S_ID as 040200, the D_ID as 04EF00, the OX_ID as 0x1001 and a formal RX_ID as 0x00F1 (step 306). The RX_ID is amended to indicate that the frame has been received by the target n_port 116-1, to which the formal RX_ID corresponds.

The return message is received by the virtual port 120 at step 306. As explained previously, none of the physical ports, i.e., target n_ports 116, are made visible to any of the hosts, such as the host node 110. At this stage, the virtual port 120 may further process the header information in the return message to modify the corresponding formal RX_ID to obtain a corresponding virtual RX_ID. The virtual RX_ID may be determined based on exchange metadata 218. The exchange metadata 218 may include a mapping between the RX_ID to be allotted by the physical port target n_port 116-1. The mapping within the exchange metadata 218 may be created by associating the formal RX_ID allotted by the physical target n_ports 116 and between a corresponding virtual RX_ID. In one example, the virtual RX_ID may be determined by performing a XOR operation between the OX_ID and the formal RX_ID. Based on the output of the XOR operation, the virtual RX_ID may be obtained.

At step 310, the FC based switching system 102 transmits to the host node 110, the return message which carries in its header, metadata corresponding to the virtual port 120 acting as the source, and the host node as the destination. The appropriate host node, i.e., the host node 110 may be identified based on the OX_ID. In such a case, the switching module 108 may determine the host node 110 to be the appropriate host node, to which the return message is to be sent. Furthermore, the header information may indicate the S_ID to be 04EF00, the D_ID to be 040100, the OX_ID to be 0x1001 and the RX_ID as the virtual RX_ID. In the present example, the virtual RX_ID is depicted as 0x10F0. Once received the host node is aware that the subsequent communication for all frame of the first exchange would have to directed to the virtual port 120 with the RX_ID to be specified as the virtual RX_ID allotted by the FC based switching system 102, i.e., 0x10F0.

In parallel, the host node 110 may further initiate a communication for a second exchange. Similar to step 302, at step 312, the host node 110 transmits a frame corresponding to the second exchange to the virtual port 120 of the FC based switching system 102. The OX_ID for the frames of the second exchange are allocated a fresh value, i.e., 0x1004 with initially the RX_ID be provided with a null value or any identifier indicating that the RX_ID is yet to be allocated. For example, the host node 110 may allocate 0xFFFF as the RX_ID. When received by the virtual port 120 of the FC based switching system 102, the virtual port aggregator 106 may further determine the ports which are associated with the virtual port 120, namely target n_port 116-1 and target n_port 116-2. Since target n_port 116-1 would be dedicated for a affecting the first exchange, the virtual port aggregator 106 may select target n_port 116-2 for transmitting the frame corresponding to the second exchange.

The switching module 108 of the FC based switching system 102 subsequently transmits the frame to the target n_port 116-2 of the target node 112. The target n_port 116-2 may further provide a return message with the formal RX_ID corresponding to the target n_port 116-2, but for the second exchange. On receiving the return message, the virtual port aggregator 106 determines a corresponding virtual RX_ID for the frame of the second exchange based on another map within the exchange metadata 218. The switching module 108, once the corresponding virtual RX_ID is determined, transmits the return message to the host node 110 with the RX_ID as the virtual RX_ID, i.e., 0x00E6, as per the present example (steps 312-320).

It is to be noted that in parallel, the frames corresponding to the first exchange would be communicated to the target n_port 116-1 through the virtual port 120 of the FC based switching system 102. For all such frame, the RX_ID provided correspond to the virtual RX_ID provided by the FC based switching system 102 at step 310. Once the virtual port 120 receives subsequent frames with the RX_ID as the virtual RX_ID, i.e., 0x00F0, the virtual port 120 determines the appropriate port, namely the target n_port 116-1 based on the virtual RX_ID, to which the frame is directed. In one example, the formal RX_ID of the target n_port 116-1 may be determined through the exchange metadata 218. In another example, the formal RX_ID may be determined based on logic which is reverse of the logic utilized for obtaining the virtual RX_ID. For example, the formal RX_ID may be further determined by performing a XOR operation of the virtual RX_ID with the OX_ID. Performing a XOR operation would provide the original, i.e., the formal RX_ID which was initially allotted by the target n_port 116-1. It is to be noted that other mechanisms for obtaining the virtual RX_ID from the formal RX_ID, and subsequently obtaining the formal RX_ID based on the virtual RX_ID may be performed through any other mechanism without deviating from the scope of the present subject. This process is repeated for all frames within the second exchange.

A similar process may also be implemented for the first exchange. When the last frame of the first exchange is transmitted, the virtual port aggregator 106 may further delete the mapping in the exchange metadata 218 of the first exchange. For example, the virtual port aggregator 106 may delete the mapping between the formal RX_ID and the virtual RX_ID for the frames corresponding to the first exchange. In another example, the virtual port aggregator 106 may determine whether the frame corresponds to the first or the last frame within an exchange based on an F_CTL bit 21 within the frame header (steps 322-330). For example, the F_CTL bit 21 set to 1 would indicate that the frame is a first frame. Similarly, another F_CTL bit, namely bit 20 when set to 1, indicates that the frame is the last frame for a given exchange.

Figure 3B:
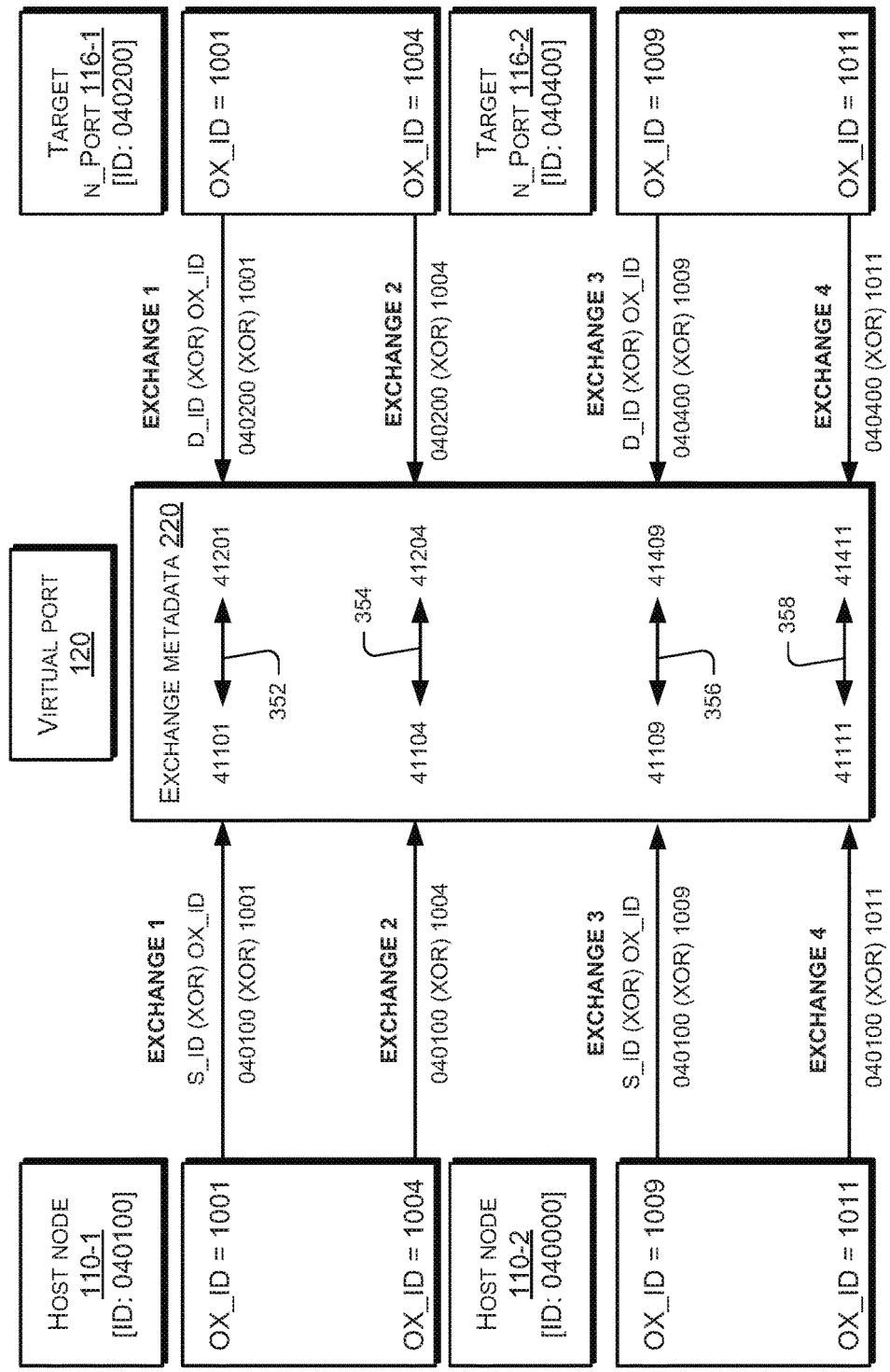
FIG. 3B is example call-flow diagram for affecting FC exchange by virtual port aggregation of target nodes between multiple host nodes and a target node.

Although the present examples have been described considering only a single node, the subject matter can also be implemented with multiple host nodes interacting with the FC based switching system 102, without deviating from the scope of the present subject matter. For example, FIGS. 3A and 3B depict exchanges being affected by multiple nodes. In the present example, the exchange is being carried out by multiple nodes, namely host node 110-1 and host node 110-2. Both the host node 110-1 and the host node 110-2 may further include one or more ports. For the present example, the host node 110-1 may be associated with port identifier (ID) 040100. The host node 110-2 may be associated with the port ID 040000. The exchange may be directed to the target node 112, having target n_port 116-1 and target n_port 116-2. As also explained in conjunction with other figures, target n_port 116-1 may be identifiable by the port ID 040200 and the target n_port 116-2 may be identifiable by the port ID 040400.

As depicted in FIG. 3B, the exchange metadata 220 is maintained by the virtual port aggregator 106. The exchange metadata 220 maps the identifiers of the originator nodes and the responder nodes. For example, for Exchange 1 with OX_ID being 1001 is originated from host node 110-1. The exchange metadata 220 maps the host node 110-1 to the target n_port 116-1 by generating a mapping key 352. In one example, the mapping key 352 may be generated based on the S_ID and the OX_ID of the originating node, i.e., the host node 110-1.

Subsequently when a new exchange from the same host node 110-1, such as Exchange 2, arrives the virtual port aggregator 106 may create a new mapping based on the OX_ID being 1004. The same may be mapped to generate a mapping key 354 for exchange 2. In a similar manner mapping keys 356, 358 may be generated for mapping the different host nodes, i.e., host node 110-1 and host node 110-2, to the target n_port 116-1 and the target n_port 116-2.

Figure 4:
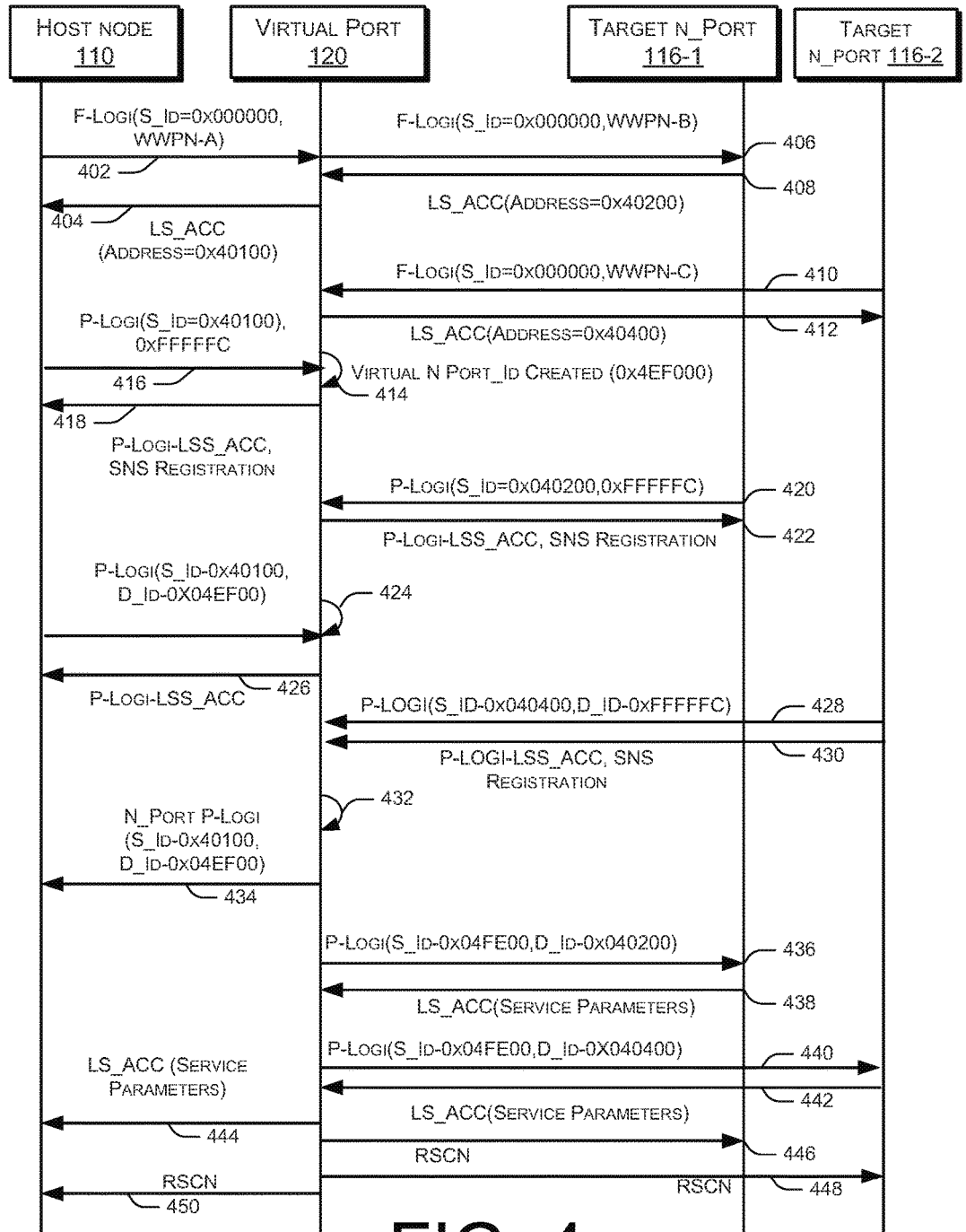
FIG. 4 are example call-flow diagram depicting registering of host node and target node with the switching system.

As mentioned previously, each of the target n_ports 116 are aggregated to provide the virtual port 120. Prior to affecting FC based exchanges between the ports of a host node, such as host node 110, the different hosts are first logged in and registered with the FC based switching system 102. The manner in which the different host nodes and the target nodes are registered with the FC based switching system 102, is depicted in conjunction with FIG. 4. FIG. 4 depicts the interaction between a host node, i.e., the host node 110 and a target node, such as the target n_ports 116. Each of the host node and the target node is associated with a plurality of ports, such as n_port 114 and the target n_ports 116.

The host node 110 and the target node 112 may initially undergo a login procedure by which they become associated with the FC based switching system 102. For example, at step 402, a F-LOGI request may be transmitted to the FC based switching system 102. While transmitting the F-LOGI request, the host node 110 may provide the name of the host node 110. At step 404, the FC based switching system 102 provides an accept link service reply with the port ID as 040100. Similarly, the F-LOGI requests by the target n_port 116-1 and the target n_port 116-2 result in the ports being provided with the port ID as 040200 and 040400, respectively (as depicted by steps 406-412).

At step 414, the virtual port aggregator 106 within the FC based switching system 102 creates a virtual port 120. The virtual port 120 is associated with an identifier 04EF00. In one example, the virtual port ID, i.e., 04EF00 may be further associated with a virtual node world wide name (WWN). The virtual node WWN may be stored in other data 222. The port identifier for the virtual port 120 is to be used as the destination identifier (as explained in conjunction with FIG. 3). Once the virtual port 120 is created, the process further proceeds with the host node 110 and the target node 112 initiating a P-LOGI process, for establishing session between the ports of the host node 110 and the FC based switching system 102, and the FC based switching system 102 and the target node 112. The host node 110 may attempt P-LOGI with the FC based switching system 102, initially requesting registration with the FC based switching system 102 with only its S_ID as 040100. In one example, the name of the host node 110 may be registered within a name server database such as Simple Name Server (SNS), or a directory service (step 416). In response to request at step 416, the host node 110 may further receive an acknowledgment (step 418).

Meanwhile, the virtual port 120 created at step 414 is also registered with the SNS. Subsequently, each of the target n_ports 116, i.e., target n_port 116-1 and the target n_port 116-2 attempt to register with the FC based switching system 102. For example, each of the ports, i.e., target n_port 116-1 and target n_port 116-2 attempt to send a P-LOGI request to the virtual port 120 of the FC based switching system 102, along with their respective port identifiers. In response to the P-LOGI requests, the FC based switching system 102 further provides an acknowledgment indicating the registration of target n_port 116-1 and target n_port 116-2 within the SNS (steps 420-422, 428-430). Once registered, each of the target n_ports 116, i.e., the target n_port 116-1 and the target n_port 116-2 are aggregated and mapped to the virtual port 120. Once the registration of target n_port 116-1 and the target n_port 116-2 is completed, the host node 110 may further transmit an N-PORT P-LOGI request (step 434). The request is further communicated to each of the target n_ports 116 which are available (steps 436 and 440). In response to the requests, both target n_port 116-1 and target n_port 116-2 provide one or more service parameters (steps 438 and 442), which are eventually communicated to the host node 110 (step 444). The service parameters may be considered as parameters which may be utilized for carrying out one or more functionalities of the FC based switching system 102. On receiving the service parameters by the FC based switching system 102, the virtual port aggregator 106 may communicate the same to the host node 110. In another example, the FC based switching system 102 may further broadcast a Registered State Change Notification (RSCN) to all the legible logged ports, i.e., the ports of the host node 110. The virtual port 120 Virtual Port will broadcast the RSCN to the target n_ports 116 (steps 446-450). In the present example, the virtual port 120 may also estimate buffer-buffer credits during the login session for each of the target n_ports 116 which have been aggregated, and associated with the virtual port 120. In such a manner the virtual port 120 may maintain the credit transaction during frame transmission for each FC exchange.

In one example, the virtual port aggregator 106 may also be used for handling one or more link failure scenarios in the aggregated link, i.e., for the ports which are associated with the virtual port 120. For example, during the exchange, a link to the target n_port 116-1 may go down. In such a case, the virtual port aggregator 106 may perform error recovery at the exchange or the sequence level. For error recovery, an error message may be provided to the host node 110. The host node 110 on receiving the error message may again resend the exchange to the virtual port 120. On receiving the exchange, virtual port 120 may transmit the exchange over another port, for example target n_port 116-3 (not shown in FIG. 1-4).

Figure 5:
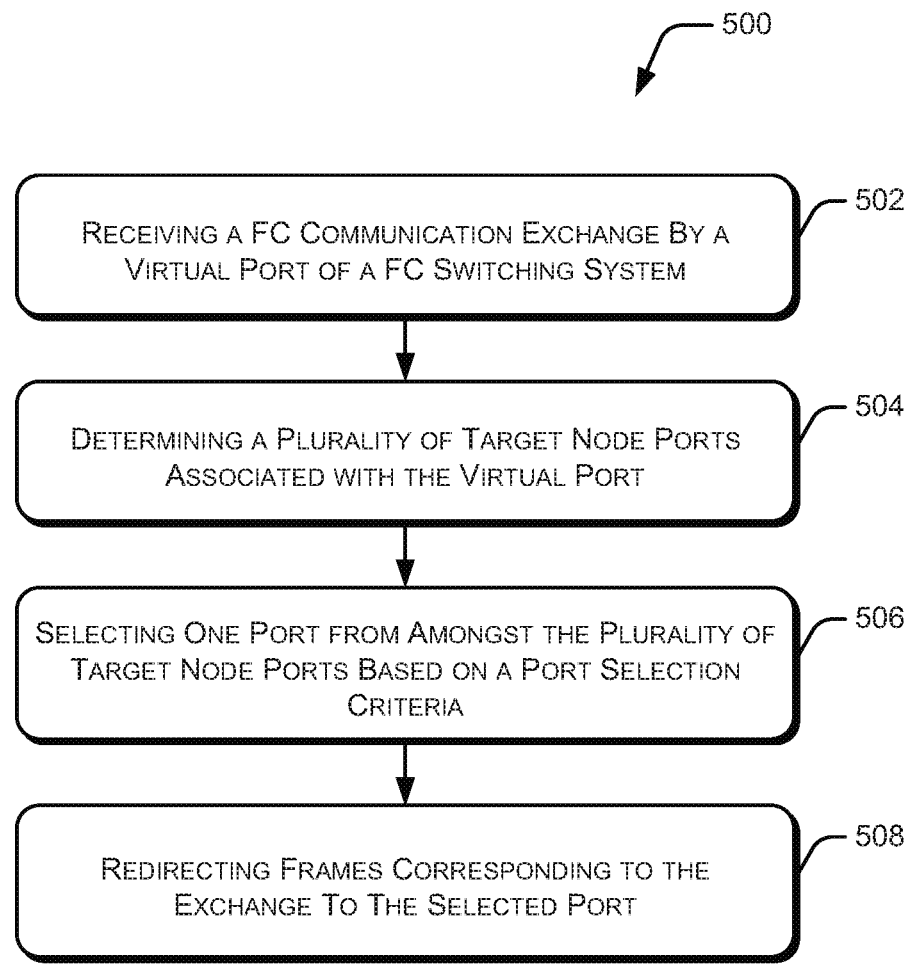
FIG. 5 is a flowchart of an example method for virtual port aggregation of target nodes and FC exchange.
Figure 6:
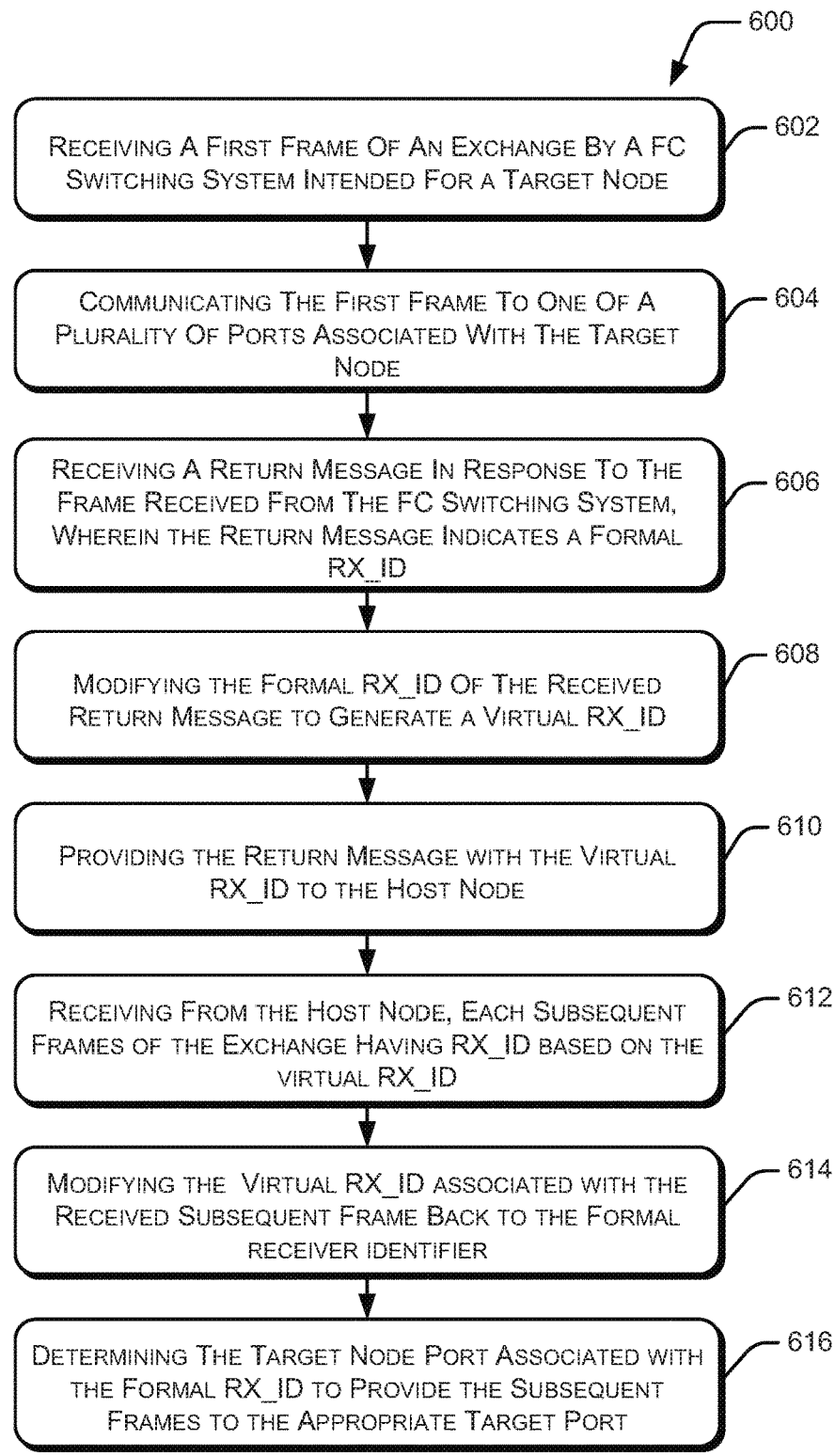
FIG. 6 is a flowchart of another example method for virtual port aggregation of target nodes and FC exchange.

FIGS. 5 and 6 illustrate example methods 500 and 600, respectively, for aggregating ports of a target node, according to an implementation of the present subject matter. The order in which the methods are described is not intended to be construed as a limitation, and any number of the described method blocks may be combined in any order to implement the aforementioned methods, or an alternative method. Furthermore, methods 500 and 600 may be implemented by processing resource or computing device(s) through any suitable hardware, non-transitory machine readable instructions, or combination thereof.

It may also be understood that methods 500 and 600 may be performed by programmed computing devices, such as the FC based switching system 102 as depicted in FIGS. 1-2. Furthermore, the methods 500 and 600 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. Although, the methods 500 and 600 are described below with reference to the FC based switching system 102 as described above, other suitable systems for the execution of these methods can be utilized. Additionally, implementation of these methods is not limited to such examples.

At block 502, a FC communication exchange is received by a virtual port of a FC switching system. The exchange is intended to being communicated to a target node, such as a storage array. For example, a host node 110 may determine a virtual port 120 of the FC based switching system 102 to which a FC exchange is to be transmitted. The virtual port 120 is in turn associated with a plurality of ports of the target node 112, namely the target n_port 116-1 and the target n_port 116-2.

At block 504, a plurality of target node ports associated with the virtual port are determined. For example, on receiving a first frame of an exchange, the virtual port aggregator 106 may determine the ports of the target node 112 which may be associated with the virtual port 120. In another example, both the target n_port 116-1 and the target n_port 116-2 may be registered within a name server database, such as a Simple Name Server (SNS), associated with the FC based switching system 102. Once registered, the target n_port 116-1 and the target n_port 116-2 may be mapped to the virtual port 120.

At block 506, one port from amongst the plurality of target node ports is selected based on a port selection criteria. For example, virtual port 120 may determine the plurality of target n_ports 116 which may be associated with the virtual port 120. Once determined, the virtual port aggregator 106 may further select one of the ports from amongst the target n_ports 116 based on one or more port selection criteria 216. Examples of port selection criteria 216 include, but are not limited to, load balancing mechanisms and predefined polices.

At block 508, frames corresponding to the exchange are redirected to the selected port. For example, once selected by the virtual port aggregator 106, the switching module 108 may direct the frame of the exchange to the selected port of the target node, such as the target n_port 116-1. Furthermore, subsequent frames of the exchange under consideration would be transmitted to the target n_port 116-1 through the virtual port 120. In a similar manner, a second FC exchange may be carried out through another port, such as the target n_port 116-2.

FIG. 6 provides another example method 600 for aggregating ports of a target node. At block 602, for affecting a FC exchange between a host node and a target node (such as a storage device), a first frame of an exchange for a target node is received by a FC switching system. For example, a frame from a host node 110 may be received by a virtual port 120 associated a virtual port ID. The frame may be further associated with frame metadata which may be provided in the frame header. In one example, the frame header may include information such as the originator ID (OX_ID) and the receiver ID (RX_ID). Since the frame has not yet been received by the target node, it is initially provided with an empty value.

At block 604, the frame is further communicated to one of a plurality of ports associated with the target node. For example, a plurality of target node ports, such as target n_ports 116, may be aggregated and associated with the virtual port 120. The virtual port aggregator 106 may determine all ports which may be associated with the virtual port 120 at which the first frame of the exchange has been received. Once all target ports have been determined, the virtual port aggregator 106 may select one port from amongst the target n_ports 116. The virtual port aggregator 106 may utilize one or more port selection criteria 216 to determine one of the ports, such as target n_port 116-1, from amongst the target n_ports 116. Once the target n_port 116-1 is selected, the switching module 108 directs the frame to the selected port.

At block 606, from the target node a return message is received in response to the frame previously communicated by the FC switching system. In the present example, the target node 112 may modify the receiver ID. The target node 112 may provide a formal receiver ID (RX_ID) based on port ID corresponding to target n_port 116-1. The formal RX_ID may be provided in the header of the return message.

At block 608, the formal receiver ID (formal RX_ID) of the return message is modified to generate a virtual receiver ID. For example, the virtual port aggregator 106 may determine the formal RX_ID corresponding to the target n_port 116-1. On obtaining the formal RX_ID from the return message, the virtual port aggregator 106 may further modify the formal RX_ID to generate a virtual RX_ID. The virtual port aggregator 106 may generate the virtual RX_ID based on a variety of mechanisms. In one example, the virtual port aggregator 106 may obtain the virtual RX_ID by performing a XOR operation between an originator ID (OX_ID) of the frame and the formal RX_ID corresponding to the target n_port 116-1.

At block 610, the return message with the virtual RX_ID is provided to the host node. For example, the virtual port aggregator 106 may identify the host node, such as host node 110 based on the OX_ID. Once identified, the virtual port aggregator 106 transmits the return message with the OX_ID and the virtual RX_ID to the host node 110.

At block 612, subsequent frames each having a RX_ID as the virtual RX_ID, are received from the host node. For example, the host node 110 may, for all the subsequent frames of the exchange, prescribe the OX_ID corresponding to its port ID, and the RX_ID based on the virtual RX_ID provided by the FC based switching system 102 (as described above in conjunction with block 610). Once the OX_ID and the virtual RX_ID have been provided for the frame, the host node 110 may transmit the frames to the virtual port 120 of the FC based switching system 102.

At block 614, the virtual receiver identifier associated with the subsequent frame received by the FC based switching system is modified back to the formal receiver ID. For example, the subsequent frame would be received by the virtual port 120 of the FC based switching system 102. On receiving the subsequent frame, the virtual port aggregator 106 may obtain the virtual RX_ID associated with the subsequent frame. The virtual RX_ID is then converted back to the formal RX_ID. In one example, the virtual port aggregator 106 converts the virtual RX_ID back to the formal RX_ID based on the same mechanism based on which the virtual RX_ID was generated. As provided in conjunction with a previous example, the virtual port aggregator 106 may further perform another XOR operation between the OX_ID and the virtual RX_ID to obtain the formal RX_ID.

At block 616, the target node port associated with the formal RX_ID is determined and the subsequent frames are provided to the appropriate target port. For example, the virtual port aggregator 106 may determine the formal RX_ID for the subsequent frame. Once determined, the virtual port aggregator 106 may further determine the corresponding port, such as target n_port 116-1. The switching module 108 may then transmit the subsequent frame to the appropriate port. The aforementioned process may be repeated for all frames of the exchange under consideration.

Figure 7:
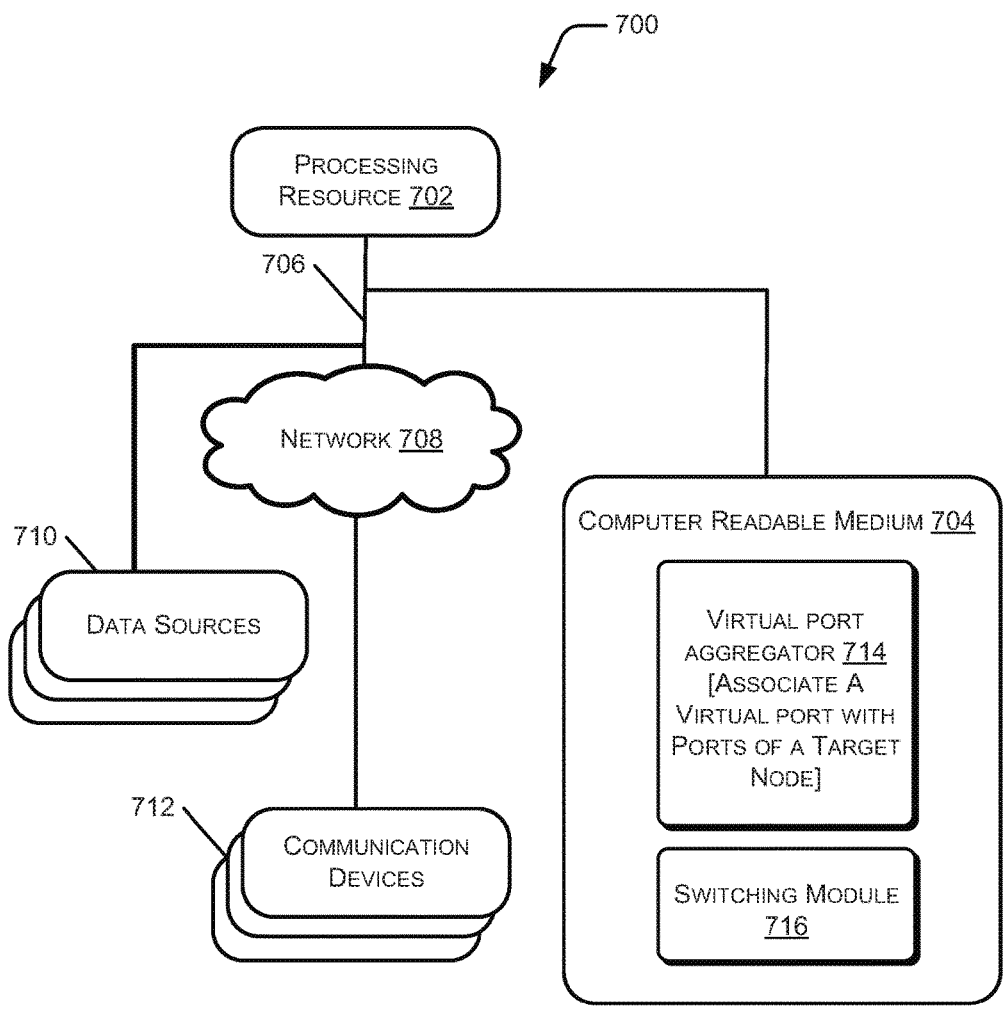
FIG. 7 is a block diagram of an example network environment implementing a non-transitory computer-readable medium, for virtual port aggregation of target nodes.

FIG. 7 illustrates a system environment 700 for aggregating ports of a target node, according to an example of the present disclosure. The system environment 700 may comprise at least a portion of a public networking environment or a private networking environment, or a combination thereof. In one implementation, the system environment 700 includes a processing resource 702 communicatively coupled to a computer readable medium 704 through a communication link 706.

For example, the processing resource 702 can include one or more processors of a computing device, such as processor(s) 104 of FC based switching system 102, for aggregating ports of a target node. The computer readable medium 704 can be, for example, an internal memory device of the computing device or an external memory device. In one implementation, the communication link 706 may be a direct communication link, such as any memory read/write interface. In another implementation, the communication link 706 may be an indirect communication link, such as a network interface. In such a case, the processing resource 702 can access the computer readable medium 704 through a network 708. The network 708 may be a single network or a combination of multiple networks and may use a variety of different communication protocols.

The processing resource 702 and the computer readable medium 704 may also be coupled to data sources 710 through the communication link 706, and/or to communication devices 712 over the network 708. The coupling with the data sources 710 enables in receiving the data in an offline environment, and the coupling with the communication devices 712 enables in receiving the data in an online environment.

In one implementation, the computer readable medium 704 includes a set of computer readable instructions, implementing a virtual port aggregator 714 and a routing module 716. The set of computer readable instructions can be accessed by the processing resource 702 through the communication link 706 and subsequently executed to process data communicated with the data sources 710 in order for prioritizing backup of files. When executed by processing resource 702, the instructions of the virtual port aggregator 714 and the routing module 716 may perform the functionalities described above in relation to the FC based switching system 102.

In operation a frame corresponding to a FC exchange is received. Once received, the virtual port aggregator 714 may determine all ports which may be associated with a virtual port, such as a virtual port 120 at which the frame of the exchange has been received. Once all target ports have been determined, the virtual port aggregator 714 may select one port from amongst the target n_ports 116 based on one or more port selection criteria 216 to determine one of the ports, such as target n_port 116-1, from amongst the target n_ports 116. Once the target n_port 116-1 is selected, the routing module 716 directs the frame to the selected port.

Subsequently, the target node may provide a return message in response to the frame received from the FC switching system, such as FC based switching system 102. The frame received from the target node may further be associated with RX_ID which is based on the target node, such as target n_port 116-1. The return message is further received, and the formal RX_ID is determined by the virtual port aggregator 714. On obtaining the formal RX_ID from the return message, the virtual port aggregator 714 may further modify the formal RX_ID to generate a virtual RX_ID. Once modified, the routing module 716 may provide the return message with the virtual RX_ID to the host node.

The host node 110 may provide subsequent frame with the appropriate OX_ID and the virtual RX_ID. The subsequent frames are received by the virtual port aggregator 714. The virtual port aggregator 714 may obtain the virtual RX_ID associated with the subsequent frames. The virtual port aggregator 714 converts the virtual RX_ID to the formal RX_ID. The virtual port aggregator 714 may obtain the formal RX_ID for the subsequent frame. Once determined, the virtual port aggregator 714 may further determine the corresponding port, such as target n_port 116-1. The routing module 716 may then transmit the subsequent frame to the appropriate port. The aforementioned process may be repeated for all frames of the exchange under consideration.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A fibre channel based switching system comprising:
a processor; and
a machine-readable storage medium comprising instructions executable by the processor to:
create a virtual port associated with a virtual port identifier;
associate the virtual port with a plurality of target node ports of a storage array by associating the virtual port identifier with port identifiers of each of the plurality of target node ports;
for a first frame of a fibre channel (FC) exchange received by the fibre channel based switching system and for the storage array, determine the plurality of target node ports of the storage array associated with the virtual port, wherein the FC exchange comprises a sequence of frames including the first frame;
in response to the identification, select a target node port of the plurality of target node ports; and
in response to the selection, transmit each frame of the sequence of frames corresponding to the fibre channel exchange to the selected target node port.

2. The system as claimed in claim 1, wherein the instructions are executable by the processor to: provide each frame of another sequence of frames of another fibre channel exchange to another of the target node ports, different than the selected target node port on which the first frame is transmitted.

3. The system as claimed in claim 1, wherein the selected target node port is selected based on port selection criteria.

4. The system as claimed in claim 3, wherein the port selection criteria is a predefined load balancing policy.

5. The system as claimed in claim 1, wherein the instructions are executable by the processor to:
generate a virtual receiver identifier for the first frame based on an identifier associated with the selected target node port;
communicate the virtual receiver identifier to the host node from which the fibre channel exchange was received; and
receive frames of the plurality of frames of the fibre channel exchange subsequent to the first frame from the host node with the receiver identifier set as the virtual receiver identifier.

6. The system as claimed in claim 1, wherein the fibre channel exchange includes Small Computer System Interface (SCSI) based commands.

7. A method comprising:
receiving a fibre channel exchange from a host node for a storage array, wherein the fibre channel exchange comprises a plurality of frames directed to a virtual port;
in response to receiving a first frame from among the plurality of frames,
determining a plurality of target node ports of the storage array associated with the virtual port;
transmitting the first frame from among the plurality of frames to the storage array via a target node port selected from the plurality of the target node ports of the storage array; and
transmitting each frame subsequent to the first frame of the plurality of frames of the fibre channel exchange to the storage array via the selected target node port, based on the transmitting of the first frame.

8. The method as claimed in claim 7, further comprising:
from each of the plurality of the target node ports, receiving a login request, wherein the login request includes at least an identifier associated with the target node port;
registering each of the plurality of target node ports with a name server database; and
mapping the identifiers of the target node ports with an identifier of the virtual port.

9. The method as claimed in claim 8, wherein the name server database is a Simple Name Server (SNS).

10. The method as claimed in claim 7, wherein the transmitting each frame subsequent to the first frame comprises:
   determining a formal receiver identifier based on transmitting the first frame via the selected target node port, wherein the formal receiver identifier is based on the identifier that corresponds to the selected target node port;
   based on the formal receiver identifier, generating a virtual receiver identifier;
   providing the virtual receiver identifier to the host node; and
   setting the receiver identifier of the subsequent frames to the virtual receiver identifier.

11. The method as claimed in claim 10, wherein the transmitting each frame subsequent to the first frame comprises:
   receiving the subsequent frames from the host node, wherein the subsequent frames are associated with the virtual receiver identifier;
   modifying the virtual receiver identifier back to the formal receiver identifier;
   determining the selected target node port based on the formal receiver identifier; and
   transmitting the subsequent frames to the selected target node port.

12. The method as claimed in claim 7, the method further comprising:
   generating an error message in the event a link to the selected target node port is down; and
   transmitting the fibre channel exchange over another target node port, from among the plurality of target node ports, different than the selected target node port.

13. The method of claim 7, further comprising:
   creating the virtual port associated with a virtual port identifier.

14. The method of claim 13, further comprising:
   associating the virtual port with the plurality of target node ports of the storage array by associating the virtual port identifier with port identifiers of each of the plurality of target node ports.

15. The method of claim 7, further comprising:
   transmitting each frame of another sequence of frames of another fibre channel exchange to another of the target node ports, different than the selected target node port on which the first frame is transmitted.

16. A non-transitory computer-readable medium comprising instructions executable by a processing resource to:
   for a first frame of a fibre channel exchange that is for a storage array and received from a host node, wherein the first frame is directed to a virtual port, determine a plurality of target node ports of the storage array associated with the virtual port, wherein the fibre channel exchange comprises a plurality of frames including the first frame;
   direct the first frame from among the plurality of frames to one target node port selected from the plurality of the target node ports based on port selection criteria; and
   directing each frame subsequent to the first frame in the plurality of frames of the fibre channel exchange to the selected target node port.

17. The computer-readable medium of claim 16, wherein the instructions are executable by the processing resource to:
   create the virtual port associated with a virtual port identifier.

18. The computer-readable medium of claim 17, wherein the instructions are executable by the processing resource to:
   associate the virtual port with the plurality of target node ports of the storage array by associating the virtual port identifier with port identifiers of each of the plurality of target node ports.

19. The computer-readable medium of claim 18, wherein the instructions are executable by the processing resource to determine the plurality of target node ports of the storage array associated with the virtual port based on a mapping between the port identifiers associated with the plurality of target node ports and the identifier of the virtual port.

20. The computer-readable medium of claim 16, wherein the instructions are executable by the processing resource to:
   provide each frame of another sequence of frames of another fibre channel exchange to another of the target node ports, different than the selected target node port to which the first frame is directed.

* * * * *